United States Patent
Backof et al.

Patent Number: 5,379,279
Date of Patent: Jan. 3, 1995

[54] COMMUNICATION DEVICE WITH TIME ASSIGNED DUPLEX OPERATION

[75] Inventors: Charles A. Backof, Coral Springs; David L. Muri, Sunrise, both of Fla.

[73] Assignee: Motorola, Inc., Schaumburg, Ill.

[21] Appl. No.: 86,071

[22] Filed: Jul. 6, 1993

[51] Int. Cl.6 .............................................. H04B 1/56
[52] U.S. Cl. ..................................... 370/24; 455/58.1; 370/84
[58] Field of Search ........................ 370/79, 29, 26, 29, 370/32, 95.1, 84, 31, 95.3, 94.1; 455/33.1-33.3, 34.1-34.2, 53.1, 54.1-54.2, 56.1, 58.1, 58.2; 379/53, 63

[56] References Cited

U.S. PATENT DOCUMENTS

| | | | |
|---|---|---|---|
| 4,754,450 | 6/1988 | Lynk, Jr. et al. | 370/29 |
| 5,001,703 | 3/1991 | Johnson et al. | 370/29 |
| 5,091,906 | 2/1992 | Reed et al. | 370/94.1 |
| 5,117,423 | 5/1992 | Shepherd et al. | 370/29 |
| 5,231,629 | 7/1993 | Kolzin et al. | 370/24 |

Primary Examiner—Douglas W. Olms
Assistant Examiner—Ajit Patel
Attorney, Agent, or Firm—M. Mansour Ghomeshi

[57] ABSTRACT

The communication device (100) operates in full duplex mode by allowing its transmitter (106) to periodically interrupt transmission to allow for a second communication device (702) to send its request-to-transmit signal. This signal is received by the receiver (108) and coupled to a controller (110). The controller (110) dynamically reduces the rate at which it codes the voice in response to the activity on the channel. The coded signal is then coupled to the transmitter (108) for transmission. A sync and control header is included at the beginning of each transmission to allow the two communication devices (100 and 702) to remain in sync and to be aware of the coding rate each of the communication devices (100 and 702) has employed in its most recent transmission. With the two communication devices (100 and 702) operating at dynamically adjusted voice coding rates, each occupies the channel for a portion of time in each frame commensurate with the information flow, thereby providing for full duplex operation.

9 Claims, 2 Drawing Sheets

COMMUNICATION DEVICE WITH TIME ASSIGNED DUPLEX OPERATION

TECHNICAL FIELD OF INVENTION

This invention is in general related to communication devices and more particularly to duplex communication devices.

BACKGROUND

As communication devices receive more widespread acceptance, and as various new uses for communication devices emerge, the need for more spectrally efficient communication becomes more evident. Spectrum efficiency has always been a challenge to communication system designers. One area of radio communication that has developed slowly because of its poor spectral efficiency is full duplex communication.

In this mode of operation, radio operators receive and transmit signals at the same time without having to take turns in transmitting to each other. However, full duplex operation is desired because it is the ultimate in communication and it is available in telephonic communication. Full duplex communication using Frequency Division Multiplexing (FDM) requires two channels, one for each transmitter. This requirement results in inefficient spectrum use because both channels are occupied even when information communication is unidirectional. Because of this disadvantage and the decrease in spectrum availability, full duplex communication in two way radios using FDM is substantially limited.

A Time Division Multiplexing (TDM) system using voice compression may provide full duplex communication with increased spectral efficiency. Similar to FDM systems, however, such a system requires dedicated time slots for transmission by each unit even when information communication is unidirectional which results in wasted channel bandwidth.

Another method of improving spectrum utilization is to have a control station manage the allocation of frequencies on a need to use basis. This requires an additional channel for the control signal and further complicates the operation of the communication device. It can therefore be seen that a communication device is highly desired that can operate full duplex with efficient spectrum utilization.

SUMMARY OF THE INVENTION

Briefly, according to the invention, a communication device is disclosed. The communication device includes a transmitter for transmitting a signal with periodic interruptions to determine if there is a request-to-transmit from a second communication device. The signal transmitted by the transmitter means includes a sync and control segment that allows the second; communication device to synchronize its request to transmit signal so that it can be received by the first communication device. A receiver means is included for receiving the request-to-transmit signal. The communication device also includes a controller means for interrupting the transmitter means to allow the receiver means to receive an incoming signal on the same channel and hence providing the communication device with full duplex operation on a single channel. The rate at which the information is coded at each of the communication devices is dynamically varied to allow for the most optimum utilization of their shared channel. The change in the cooling rate is communicated between the two devices via the sync and control segment of the transmit signal.

DETAILED DESCRIPTION OF THE PREFERRED EMBODIMENT

Duplex operation of communication devices using FDM requires separate transmit and receive frequencies (channel) on which simultaneous communication may be conducted. The allocation of two channels to a single communication is spectrally inefficient. To combat the spectral inefficiency of conventional duplex communication devices the present invention provides for a system whereby communication devices are time assigned using variable rate voice coding schemes. By allowing the voice/information coding rate to dynamically vary as the demand for transmission by each party varies, one can achieve a conceived full duplex operation in a simplex environment without occupying unnecessary spectrum.

Figure 1:
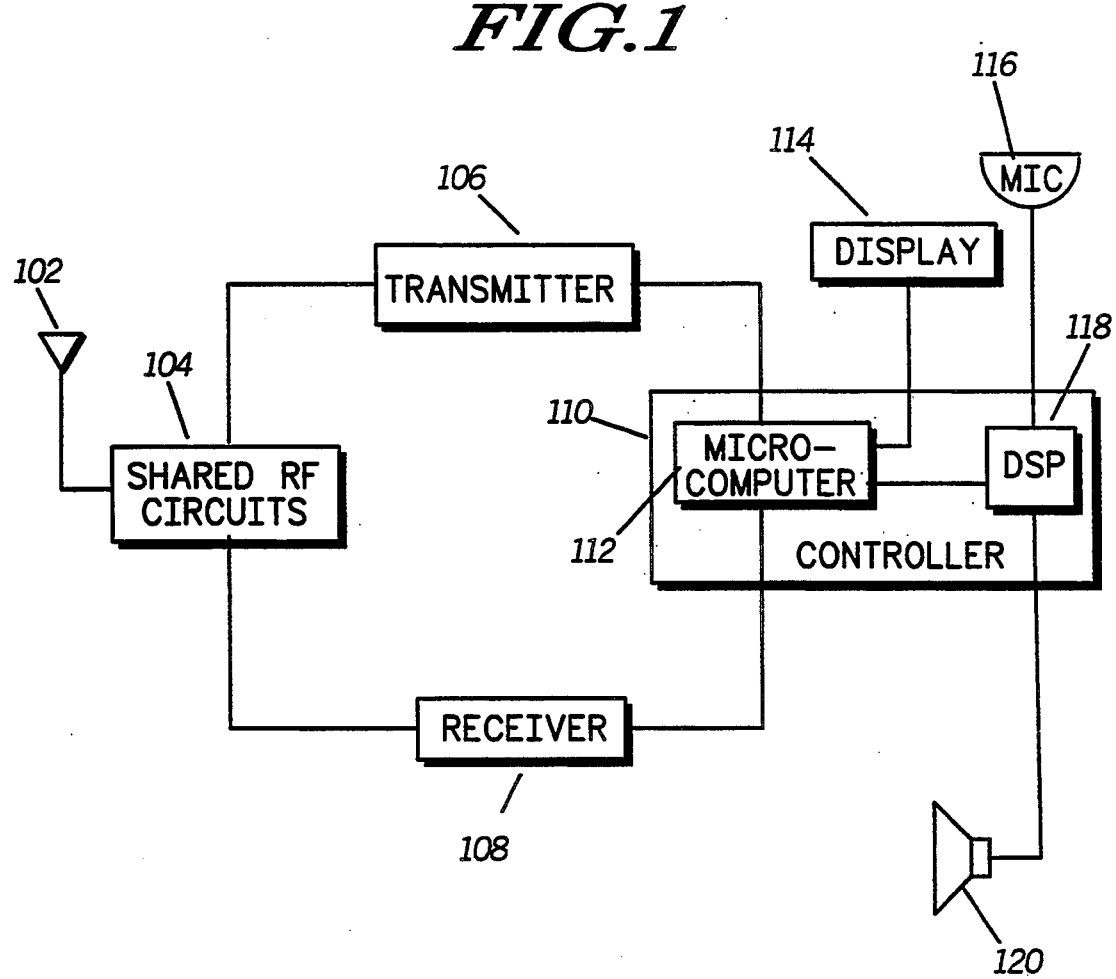
FIG. 1 shows the communication device in accordance with the present invention.

The principles of the present invention will be better understood by referring to the drawings of which FIG. 1, is first described. FIG. 1, shows a communication device 100, in accordance with the present invention. Antenna 102 is used to receive and transmit radio frequency signals. Transmit signals generated by a transmitter 106, are coupled to the antenna 102 via an RF circuit block 104. Received signals are coupled from antenna 102, to a receiver 108 through the RF circuits 104. The RF circuits 104 need not necessarily be shared by the transmitter 106 and receiver 108 as shown in this embodiment. A controller 110 controls the operation of the entire communication device 100 including, but not limited to, the transmitter 106 and the receiver 108. The controller 110 includes a microcomputer 112 and a digital signal processor (DSP) 118. The microcomputer 112 in conjunction with the DSP 118 provide for the interpolation of voice. Either of the DSP 118 or the microcomputer 112 could provide the function of the information/voice coder. A microphone 116 couples voice to the DSP 118. A speaker 120 also coupled to the DSP 118 presents received voice to the user. Data Components of the received signal, if any, are coupled to a display 114 via the microcomputer 112. The DSP 118 provides for the coding of voice. Also accomplished by the DSP 118 is the decoding of voice received at the receiver 108 and coupling that decoded voice to the speaker 120.

Figure 7:
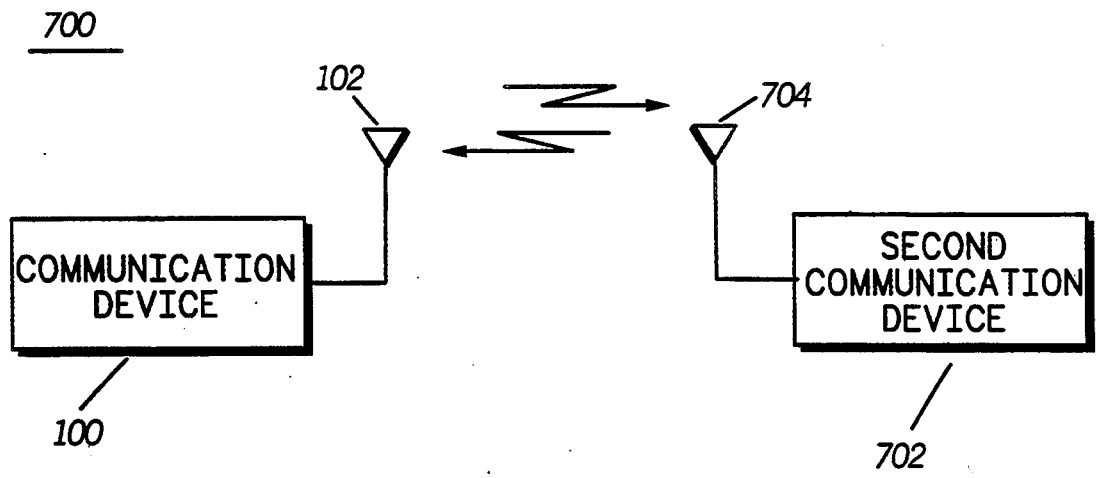
FIG. 7 shows a communication system in accordance with the present image.

Referring now to FIG. 7, a blocked diagram of a communication system 700 in accordance with the present invention is shown. The system 700 includes the communication device 100 and its associated antenna 102. A second communication device 702 and its associated antenna 704 are also shown. The components of the communication device 702 are similar to those of the device 100.

The operation of the communication device 100 and the method with which full duplex communication is accomplished between devices 100 and 702 is better understood by referring to the timing diagrams of FIGS. 2 through 6. These timing diagrams demonstrate the allocation of time to the communication devices 100 and 702 in order to provide full duplex operation. These FIGS include a transmit timing diagram and a receive timing diagram. These timing diagrams show the variation in the time required for each device to transmit its respective signal. The variation in time is achieved via a dynamic alteration of the information coding rate. The timing diagrams include a complete cycle during which the communication devices 100 and 702 transmit and receive signals from each other. The time lines shown in these FIGS. include a sample period or frame 202 which is repeated in time.

Figure 2:
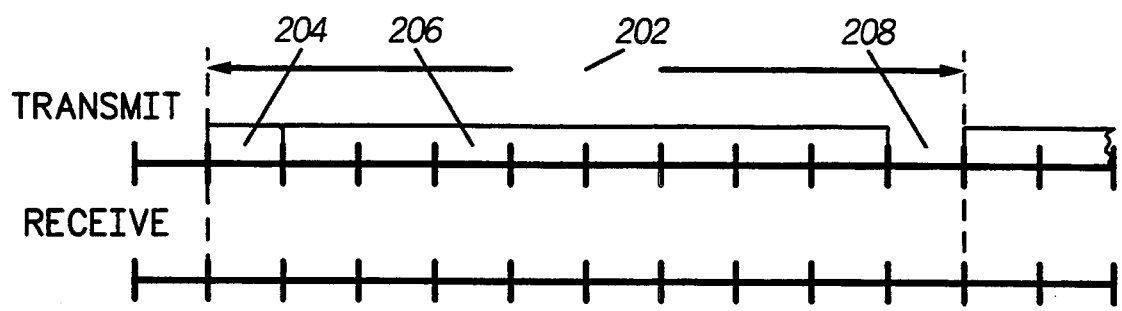
FIG. 2 shows a timing diagram of the operation of the communication device of FIG. 1 in accordance with the present invention.

Referring specifically to FIG. 2, the timing diagram on the transmit time line includes a synchronization (sync) and control signal 204 followed by a transmit signal 206. The transmit signal 206 is the intelligence (voice, data . . . ) that is being transmitted. In the preferred embodiment, the transmit signal 206 is assumed to be voice and is transmitted at a 9600 Bits Per Second (BPS) rate. Similarly, the sync and control signal 204 are transmitted at 9600 BPS. This is the overall transmission rate utilized for this embodiment. To achieve this rate, voice signals coupled from the microphone 116 are coded at 4800 BPS at the controller 110. This is the first voice coding rate. A Forward Error Correction (FEC) is used to add error correction bits to the voice signal. This step increases the coding rate to 9600 BPS. The period 206 shows the time required to transmit this 9600 BPS coded signal at the preferred rate of transmission which is also 9600 BPS. Following the transmission of this signal, period 206, the transmitter 106 releases the channel for a period 208. This time slot 208 is reserved for a second transmitter to make a request-to-transmit a signal. In other words, the device 100 is periodically interrupted to determine if a request-to-transmit signal from the second communication device 702 has been made. During time slot 208, the receiver 108 receives the request-to-transmit signal from the communication device 702.

Figure 3:
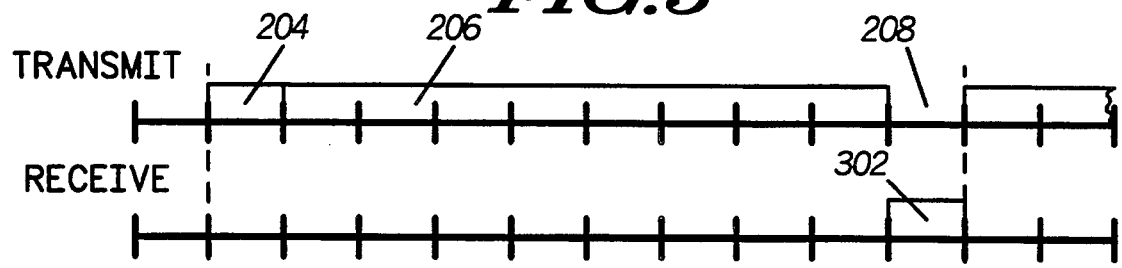
FIG. 3 shows a timing diagram of a sample operation of the communication device of FIG. 1, in accordance with the present invention.

Referring to FIG. 3 and specifically to the receive time line, a request 302 is shown to have been transmitted by the second communication device 702. As mentioned, the controller 110 interrupts the transmitter 106 so that the channel is freed up for the second communication device 702 to transmit its request-to-transmit signal. Similarly, the microcomputer 112 directs the receiver 108 to receive this request-to-transmit signal. It is noted that all this activity is taking place on the same channel. In other words, transmission of block 206 preceded by block 204 are conducted on the same channel that the request-to-transmit 302 is made. There is no interference on the channel because the communication device 100 interrupts its transmission during the period 302. Once the request for transmission has been received by the receiver 108, the DSP 118 reduces the coding rate of the voice signal to a first reduced voice coding rate. In the preferred embodiment, the first reduced voice coding rate is at 2400 BPS. The voice signal, reduced to the first reduced voice coding rate, is then transmitted via the transmitter 106. This is shown in FIG. 4.

Figure 4:
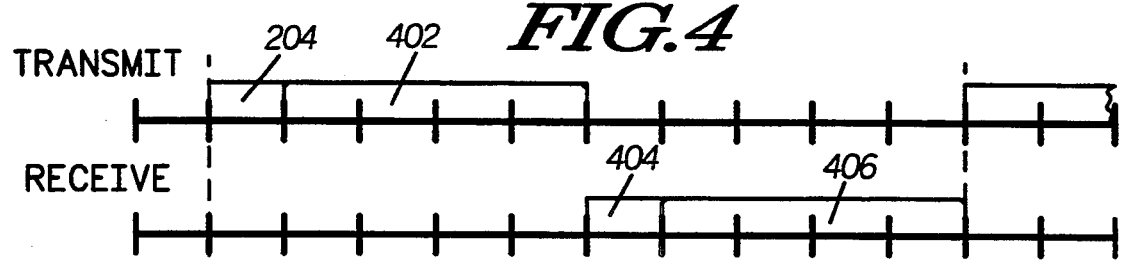
FIG. 4 shows a timing diagram of a sample operation of the communication device of FIG. 1, in accordance with the present invention.

Referring now to FIG. 4, it can be seen that the transmit line includes the sync and control segment 204 followed by the transmission of voice at a first reduced voice coding rate 402. This coded signal is then appended with error correction bits and sync/control information to prepare it for transmission. The rate of this error coded signal is consequently increased to 4800 BPS. Since the modulation rate remains at 9600 BPS, the transmission of this 4800 BPS signal takes half the time to complete. The time saved is given to the second communication device 702 to transmit its signal. The device 702 having participated in all this handshaking knows that it must transmit its signal at a second reduced voice coding rate, shown by the timing block 406. As has been shown, the first and the second reduced voice coding rates are the same in the preferred embodiment. It is noted that this is a design choice and is governed by other system parameters and requirements. Preceding block 406 is a sync and control signal 404 which is transmitted to allow the two communication devices 100 and 702 to be in sync with each other. The signal 404 further includes any control signals generated by the communication device 702. The signal transmitted during the period 406 is received by the receiver 108 and presented to the controller 110. The controller 110 decodes the sync and control signal 404 and determines the coding rate and proceeds to decode the voice. The decoded voice is presented to the speaker 120 via DSP 118. With these reduced voice coding rates, the communication devices 100 and 702 may conduct full duplex operation on the same channel.

It is noted that the transmission of the reduced voice coding rates will reduce the quality of voice communicated between the two devices 100 and 702. However, the degradation in the voice quality is not appreciable and can be tolerated because both users are talking and listening at the same time.

Figure 5:
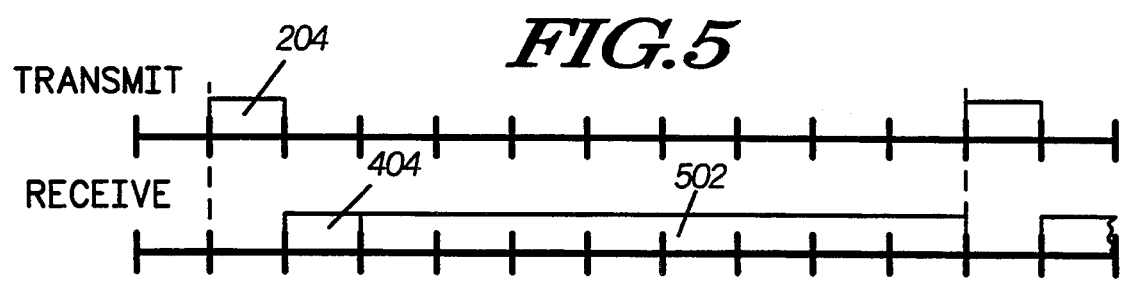
FIG. 5 shows a timing diagram of a sample operation of the communication device of FIG. 1, in accordance with the present invention.
Figure 6:
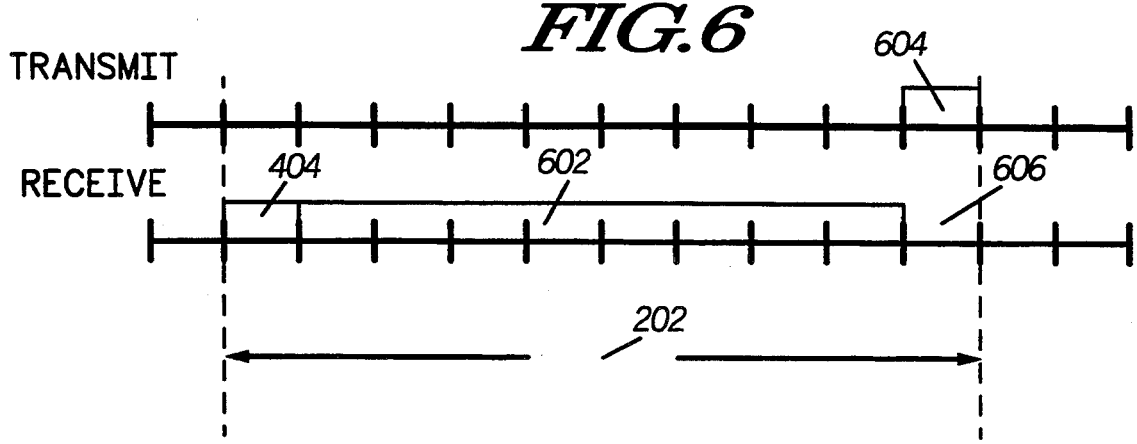
FIG. 6 shows a timing diagram of a sample operation of the communication device of FIG. 1, in accordance with the present invention.

Referring now to FIG. 5, the situation whereby the first communication unit 100 has stopped sending voice data is shown. Here, the second communication unit 702 goes back to a second voice coding rate, preferably 4800 bits per second, as shown by the time line block 502. It is noted that the signal is still preceded by the sync and control signal 404 and that it is coded to 9600 BPS with FEC section of the controller 110. It is further noted that the communication device 100 continues to transmit the sync and control signal 204 because the request-to-transmit at the device 100 has not yet been deactivated. The communication device 100 stops transmitting sync and control signal when it has no more information to transmit. This situation is depicted in FIG. 6, where the communication device 100 is receiving a signal including the sync and control 404 and the voice information 602 having the second voice coding rate. Block 606 shows the periodic interruption of the transmission by the communication device 702. During this periodic interruption the communication device 100 can request transmission, as shown by time line block 604.

The request-to-transmit signal may be activated manually via a push-to-talk or operationally via a voice operated transmitter (VOX). To detect as to whether a speaker has paused, a voice lull circuitry may be utilized. In the preferred embodiment, the DSP 118 includes the voice lull detector. The absence of signal detected via the voice lull detector is communicated to the microcomputer 112 which proceeds to add an authorization word to the sync and control signal. This word informs the second communication device 702 to increase its voice coding rate to a maximum level, which is 4800 BPS in the preferred embodiment.

It can be seen that by interpolating the speakers using time assigned transmission, communication devices can operate in a perceived full duplex mode on a single channel with maximum spectral efficiency. This channel may be a narrow band channel because the maximum rate of transmission as depicted in the preferred embodiment could be limited to 9600 BPS. Therefore, full duplex communication can be accomplished in a narrow band channel such as a 6.25 KHz channel using an efficient modulation. In the preferred embodiment, a Quadrature Phase shift Keying (QPSK) modulation is used for its spectrally efficient characteristics. With this scheme, as speakers speak and pause, the coding rates flip between high and low to accommodate both speakers with maximum throughput and spectral efficiency.

It is understood that although the preferred embodiment shows two communication devices, more than two communication devices may be included in the system. In addition, a central station may be used to control the allocation of channel time. In this situation the central station may be used to provide additional amplification for more area coverage.

In summary, it has been shown that two communication devices may communicate with each other using various information coding rates to accomplish full duplex operation on a single narrow band channel. By detecting requests for transmission, the originating unit reduces its information coding rate. Since the modulation rate remains the same, the reduced coded signal takes less time to transmit. This frees up time for the second communication device to transmit its information. The transmission by the second communication device 702 takes place during a receive period at a reduced information coding rate. This is the second portion of the transmit/receive cycle 202. The second communication device 702 increases its information coding rate when the first device 100 has no information to transmit. The dynamic adjustment of voice coding rates allows the two devices to communicate with each other in a perceived full duplex mode without wasting spectrum. The quality degradation that results with the reduced information coding rate is tolerable because of the full duplex operation.

In essence, the voice coding rate of the two communication devices is dynamically altered. The variation in the code rates is continuously communicated between the two units. The transmission rate, however, remains at a constant rate sufficient to transmit information at the highest coding rate. The reduction in the coding rate allows the information signal to be transmitted in a shorter period of time. The time saved will be used by the other device to transmit its information. This provides for a pseudo duplex operation with maximum spectral efficiency.

What is claimed is:

1. A first simplex communication device for communicating full duplex on a single narrow band channel, comprising:
   a transmitter for transmitting a first information signal at a maximum information coding rate on the channel;
   a receiver for receiving a second information signal at half the maximum information coding rate on the channel, including a request to transmit signal from a second simplex communication device; and
   a controller, comprising:
   means for reducing the information coding rate to half the maximum information coding rate in order to reduce the time required to transmit the information signal to provide for a receive period;
   means for determining when no information signal is available for transmissions;
   the receiver includes means for receiving on the channel the second information signal at the maximum information coding rate; and
   the controller further includes switching means for switching the maximum information coding rate between the first and the second devices thereby providing for full duplex operation.

2. The communication device of claim 1, wherein the transmitter means includes a transmitter capable of transmitting a sync and a control signal.

3. The communication device of claim 2, wherein the control signal includes information on the voice coding rate.

4. The communication device of claim 1, wherein the request includes a voice activated request.

5. The communication device of claim 1, wherein the request includes a manually activated request.

6. The communication device claim 1, wherein the controller includes means for generating a sync signal to synchronize the communication device with a second communication device.

7. The communication device of claim 1, wherein the controller includes means for detecting voice lulls.

8. A method for providing a first simplex communication device with full duplex operation at a fixed rate of transmission on a channel, comprising the step of:
   transmitting an information signal generated by a user and having a maximum voice coding rate to a second communication device;
   periodically interrupting transmission;
   receiving a request to transmit signal from the second communication device on the channel during the periodic interruptions;
   dropping the voice coding rate to a first reduced voice coding rate to allow the transmission of the information signal to take less time on the channel;
   transmitting at the first reduced voice coding rate on the channel;
   simultaneously receiving at the first reduced voice coding rate on the channel for full duplex operation;
   determining when no additional information is generated by the user; and
   stopping transmission at the first communication device and receiving information at the maximum voice coding rate from the second communication device.

9. A method for providing a first simplex communication device with full duplex operation, comprising the steps of:

transmitting an information signal at a maximum information coding rate on a channel;
receiving a request-to-transmit signal from a second simplex communication device;
reducing the information coding rate to half the maximum information coding rate in order to reduce the time required to transmit the information signal to provide for a receive period;
receiving on the channel a second information signal from the second communication device at half the maximum information coding rate during the receive period;
determining when no information signal is available for transmission;
receiving on the channel the second information signal at the maximum information coding rate; and
switching the maximum information coding rate between the first and the second communication devices thereby providing for a full duplex operation.

* * * * *